"""# (12) United States Patent
Favaretto et al.

(10) Patent No.: US 11,326,838 B2
(45) Date of Patent: May 10, 2022

(54) ROAD VEHICLE PROVIDED WITH A COOLING SYSTEM WITH "V"-SHAPED DUAL RADIATOR

(71) Applicant: FERRARI S.p.A., Modena (IT)

(72) Inventors: Fabrizio Favaretto, Formigine (IT); Francesco Crotti, Modena (IT)

(73) Assignee: FERRARI S.P.A., Modena (IT)

( * ) Notice: Subject to any disclaimer, the term of this patent is extended or adjusted under 35 U.S.C. 154(b) by 21 days.

(21) Appl. No.: 16/436,329

(22) Filed: Jun. 10, 2019

(65) Prior Publication Data

US 2019/0390913 A1 Dec. 26, 2019

(30) Foreign Application Priority Data

Jun. 11, 2018 (IT) .......... 102018000006210

(51) Int. Cl.
*F28D 1/04* (2006.01)
*F28D 21/00* (2006.01)
*B60H 1/10* (2006.01)
*B60H 1/24* (2006.01)
*F28D 1/02* (2006.01)

(52) U.S. Cl.
CPC ............ *F28D 1/0443* (2013.01); *B60H 1/10* (2013.01); *B60H 1/243* (2013.01); *F28D 2001/0266* (2013.01); *F28D 2021/0092* (2013.01)

(58) Field of Classification Search
CPC .......... F28F 2280/06; F28F 9/26; F28F 9/262; F28D 1/0426; F28D 1/0443; F28D 2001/0266; F28D 2001/0273; F28D 7/163; F28D 1/0246; B60H 1/243; B60K 11/04;

(Continued)

(56) References Cited

U.S. PATENT DOCUMENTS 1,227,770 A * 5/1917 Fleischmann ............ F28F 9/001
165/149
4,830,312 A * 5/1989 Hain ...................... B64D 33/08
244/17.11

(Continued)

FOREIGN PATENT DOCUMENTS

DE          19937604 A1    2/2000
DE      102008022887 A1   11/2009

(Continued)

OTHER PUBLICATIONS

Search Report issued in EP Application No. 19179469.2-1004, dated Sep. 6, 2019; 6 pages.

(Continued)

*Primary Examiner* — Frantz F Jules
*Assistant Examiner* — Jason N Thompson
(74) *Attorney, Agent, or Firm* — Cantor Colburn LLP

(57) ABSTRACT

A road vehicle having: two front wheels; two rear wheels; an engine, which transmits the motion to drive wheels; and a cooling system, which is connected to the engine. The cooling system has: a cooling circuit where a cooling liquid flows; two first radiators, which are connected to the cooling circuit and make up, together, a first "V"-shaped structure, which is arranged on a right side of the road vehicle; and two second radiators, which are connected to the cooling circuit and make up, together, a second "V"-shaped structure, which is arranged on a left side of the road vehicle.

7 Claims, 5 Drawing Sheets

(58) Field of Classification Search
CPC ........ F01P 3/18; F01P 11/10; F01P 2003/182; F01P 2003/185; F01P 2003/187
USPC .......................................... 165/44; 180/68.4
See application file for complete search history.

(56) References Cited

U.S. PATENT DOCUMENTS

| | | | | |
|---|---|---|---|---|
| 5,417,177 | A * | 5/1995 | Taguchi | B60F 3/0053 |
| | | | | 165/44 |
| 5,566,746 | A * | 10/1996 | Reise | B60K 11/04 |
| | | | | 165/41 |
| 5,947,195 | A * | 9/1999 | Sasaki | B60H 1/00328 |
| | | | | 165/124 |
| 6,422,182 | B1 * | 7/2002 | Ohta | B60K 11/04 |
| | | | | 123/41.29 |
| 7,540,320 | B1 * | 6/2009 | Semmes | F24F 13/28 |
| | | | | 165/119 |
| 2003/0183432 | A1 * | 10/2003 | Suzuki | F01P 3/18 |
| | | | | 180/68.1 |
| 2007/0193725 | A1 | 8/2007 | Coy et al. | |
| 2009/0140543 | A1 * | 6/2009 | Caldirola | B60T 5/00 |
| | | | | 296/180.5 |
| 2009/0223757 | A1 * | 9/2009 | Ballard | F16D 65/847 |
| | | | | 188/264 R |
| 2009/0250191 | A1 * | 10/2009 | Klein | F28F 13/003 |
| | | | | 165/44 |
| 2012/0247709 | A1 | 10/2012 | Soldan et al. | |
| 2016/0341482 | A1 * | 11/2016 | Lehmann | F28D 1/05333 |
| 2017/0144533 | A1 * | 5/2017 | Gilotte | B62D 25/085 |

FOREIGN PATENT DOCUMENTS

| | | |
|---|---|---|
| EP | 0318885 A2 | 6/1989 |
| JP | S628879 A | 1/1987 |
| JP | H0274483 A | 3/1990 |

OTHER PUBLICATIONS

Search Report issued in Italian Application No. 201800006210, completed Sep. 26, 2018; 7 pages.

* cited by examiner

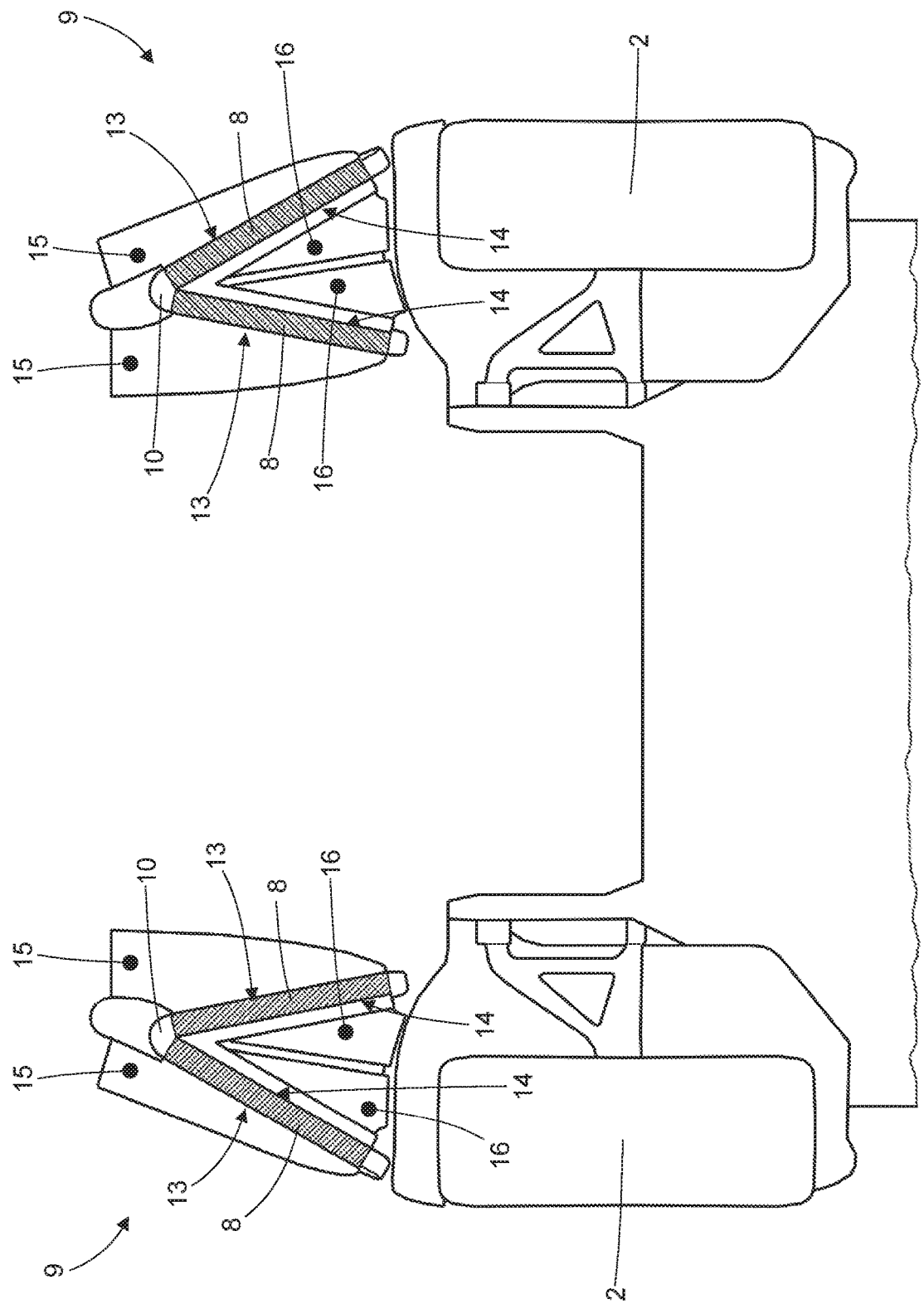

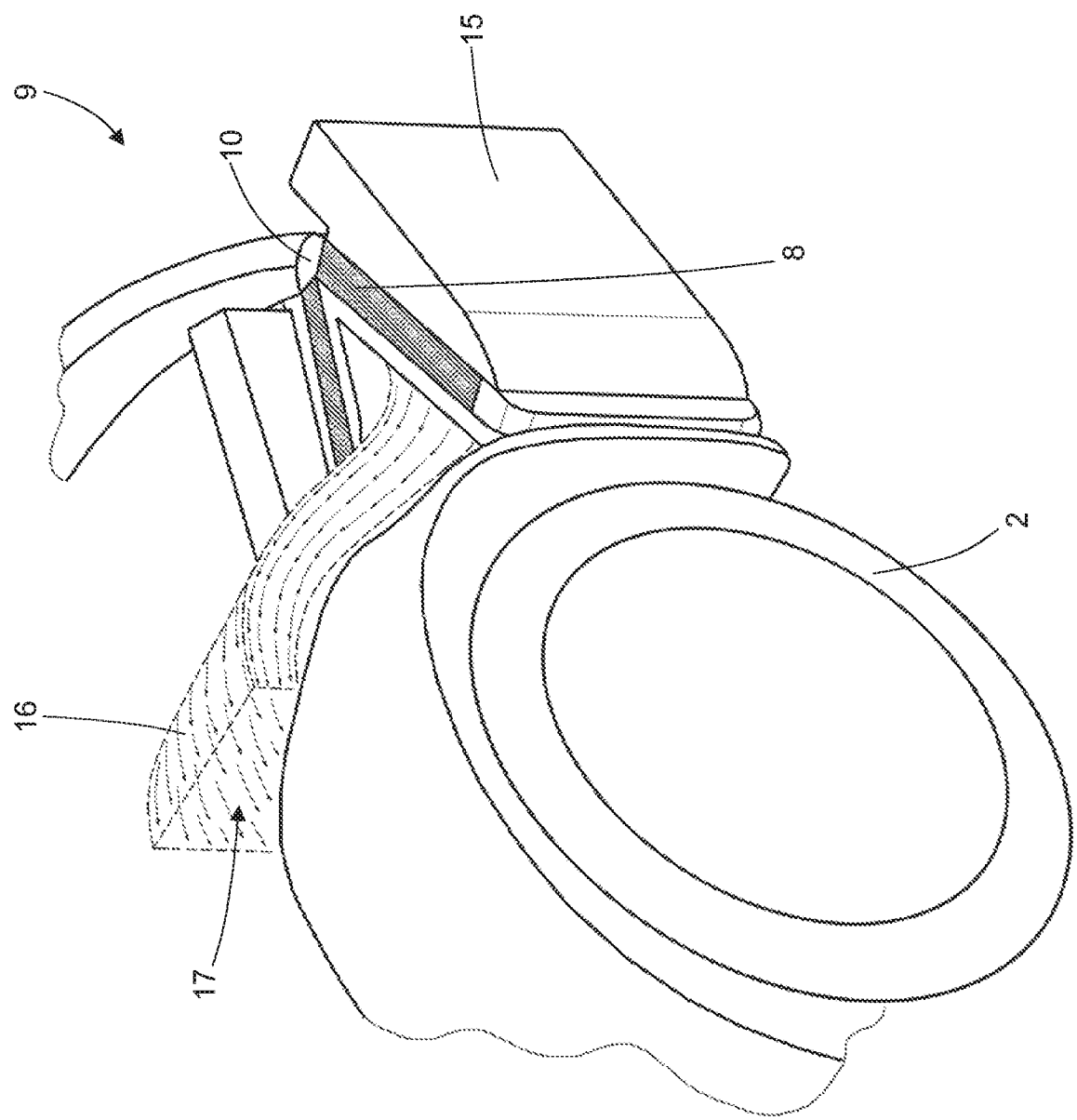

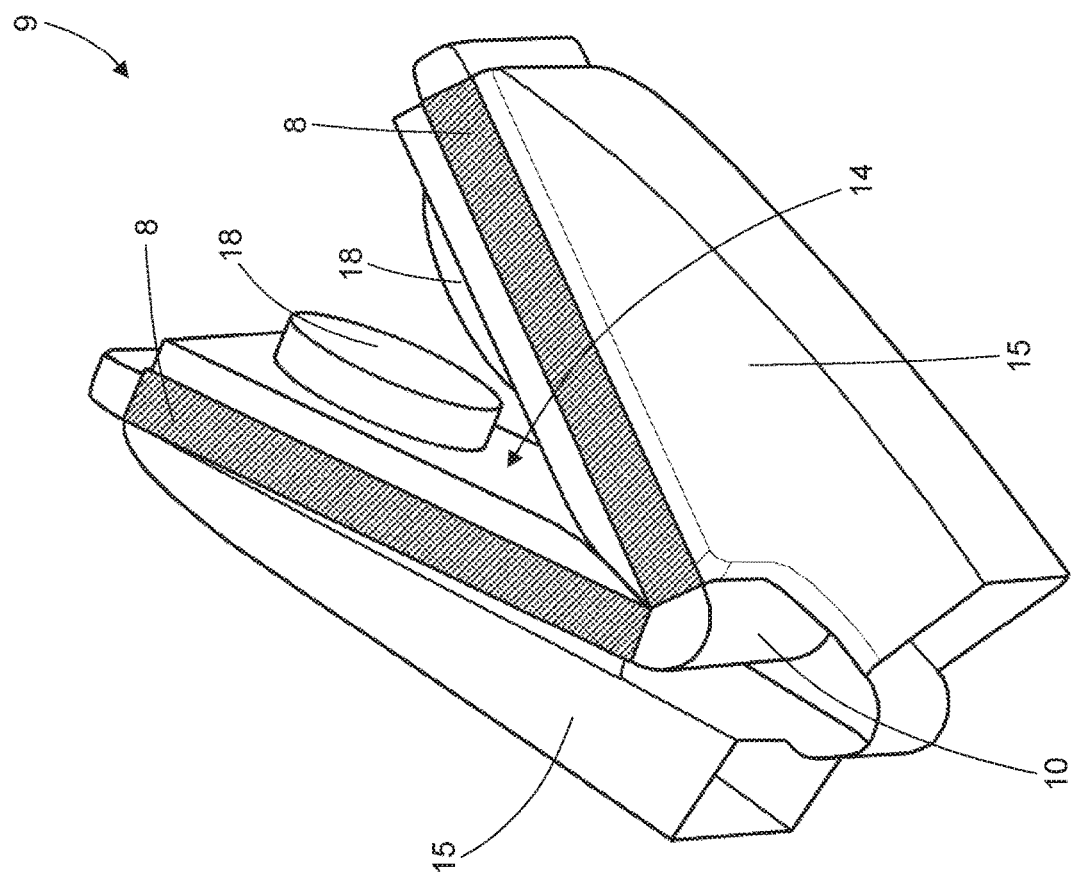

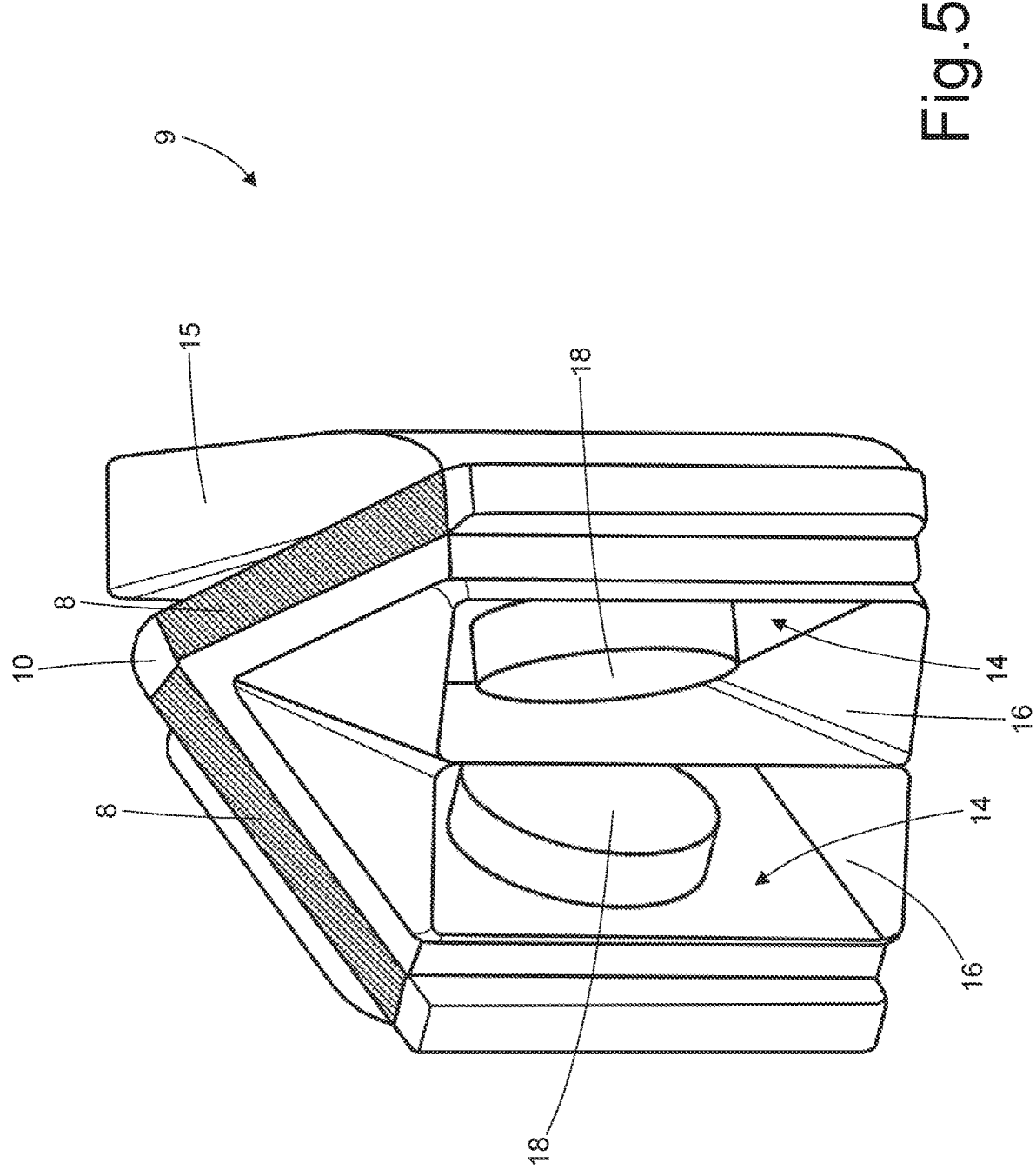

ROAD VEHICLE PROVIDED WITH A COOLING SYSTEM WITH "V"-SHAPED DUAL RADIATOR

CROSS-REFERENCE TO RELATED APPLICATIONS

This Patent application claims priority from Italian Patent Application No. 102018000006210 filed on Jun. 11, 2018, the entire disclosure of which is incorporated herein by reference.

TECHNICAL FIELD

The invention relates to a road vehicle provided with a cooling system.

PRIOR ART

The cooling system of a road vehicle fulfils the function of cooling down the engine (which can be an internal combustion heat engine and/or and electric motor) releasing heat to the outside (namely, to the atmosphere).

The cooling system of a road vehicle comprises a cooling circuit where a cooling liquid (typically water with the addition of anti-freeze and anti-corrosion agents) flows; the cooling circuit normally extends inside the engine (namely, part of the cooling circuit is obtained inside the engine so as to directly remove the heat produced by the engine). The cooling system comprises a circulation pump, which normally is directly operated by the engine and causes the cooling liquid to flow. Finally, the cooling system comprises at least one radiator, which is hit by a flow of air when the road vehicle moves and in which the cooling liquid releases heat to the outside (namely, the radiator is water-air heat exchanger designed to cause the cooling liquid coming from the engine to cool down). Generally speaking, a radiator used in road vehicles consist of a grid of small tubes (where the cooling liquid flows) alternated with fins, which, by effectively releasing the heat of the liquid to the external air current flowing through, if necessary with the help of a fan, allow for a quick reduction of the temperature of the cooling liquid flow.

When the power generated by the engine (internal combustion heat engine and/or electric motor) of the road vehicle increases, the heat produced by the engine at full load increases as well and, hence, the ability of the radiator of the cooling system to dispose of the heat must increase accordingly. In order to increase the ability of the radiator of the cooling system to dispose of the heat, the total heat exchange surface must be increased, which means that the complexity of the geometry of the radiator must be increased (even though manufacturers have already reached limits that can hardly be exceeded), the number of radiators must be increased and/or the size of the radiators must be increased. However, the aerodynamic needs of modern road vehicles combined with need to accommodate, in the road vehicle, an ever increasing number of components make it very hard to find a suitable space capable of housing different large-sized radiators.

Patent applications DE19937604A1 and EP0318885A2 describe a cooling system for a work vehicle provided with two radiators, which face one another and are inclined so as to form, together, a "V"-shaped structure.

Patent applications JPH0274483A and JPS628879A describe a cooling system for a motorcycle provided with two radiators, which face one another and are inclined so as to form, together, a "V"-shaped structure.

DESCRIPTION OF THE INVENTION

The object of the invention is to provide a road vehicle provided with a cooling system, which allows the vehicle to effectively and efficiently dispose of a large quantity of heat, though having small dimensions.

According to the invention, there is provided a road vehicle provided with a cooling system according to the appended claims.

The appended claims describe preferred embodiments of the invention and form an integral part of the description.

BRIEF DESCRIPTION OF THE DRAWINGS

The invention will now be described with reference to the accompanying drawings, which show some non-limiting embodiments thereof, wherein:

FIG. 2 is a schematic view, on a larger scale, of a front portion of the road vehicle of FIG. 1, highlighting two water-air heat exchangers of the cooling system; and FIGS. 3, 4 and 5 are three different schematic, perspective views of a water-air heat exchanger of FIG. 2.

PREFERRED EMBODIMENTS OF THE INVENTION

Figure 1:
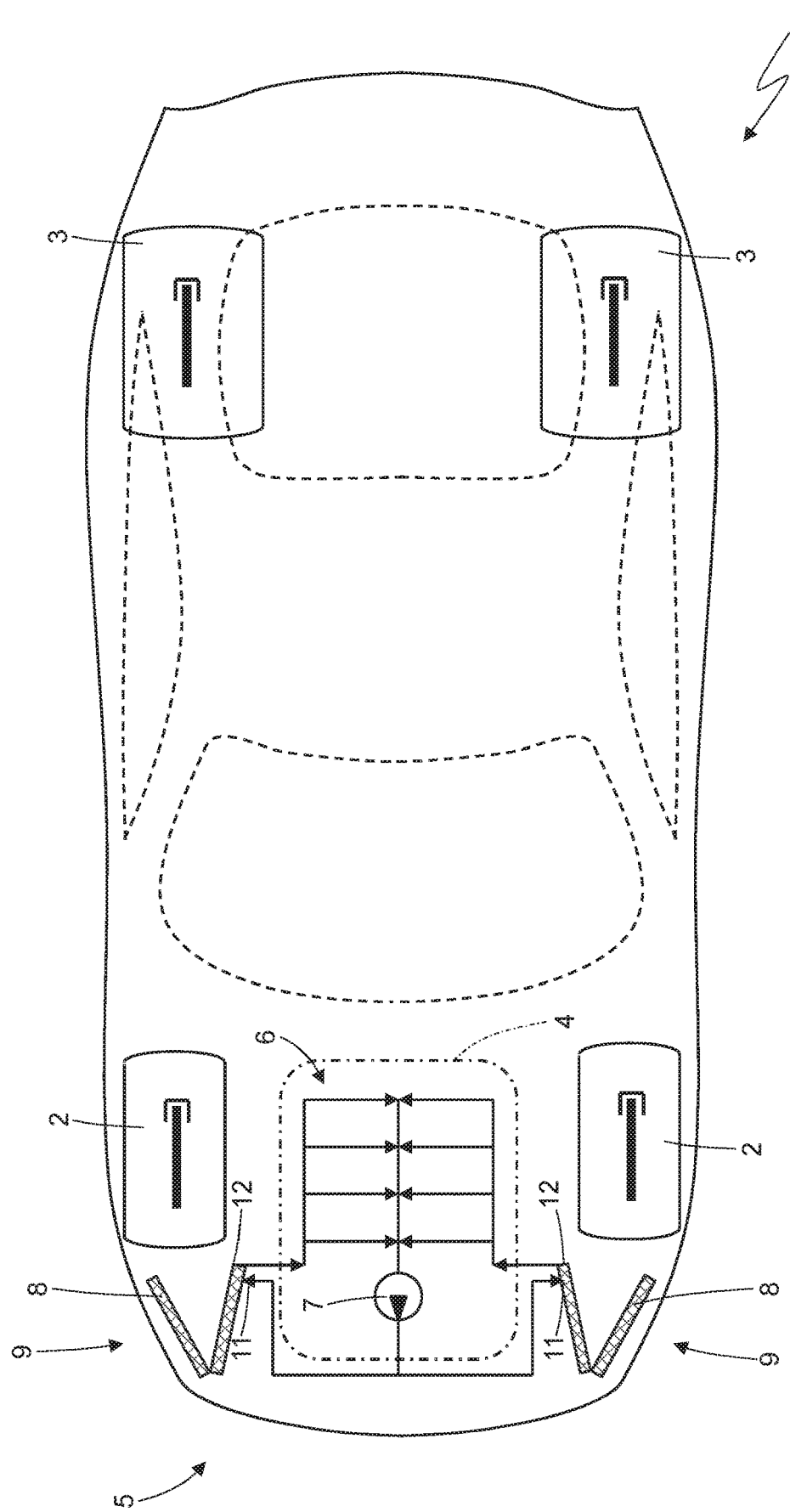
FIG. 1 is a schematic, plan view of a road vehicle provided with a cooling system and manufactured according to the invention.

In FIG. 1, number 1 indicates, as a whole, a road vehicle provided with two front wheels 2 and with two rear drive wheels 3, which receive the torque from an engine 4 (internal combustion heat engine and/or electric motor) arranged in a front position (though, alternatively, it could also be arranged in a central or rear position).

The road vehicle 1 comprises a cooling system 5, which is coupled to the engine 4 and fulfils the task of cooling down the engine 4 (namely, of removing the heat generated by the engine 4 during its operation)

The cooling system 5 comprises a cooling circuit 6 where a cooling liquid (typically water with the addition of anti-freeze and anti-corrosion agents) flows; the cooling circuit 6 normally extends inside the engine 4 (namely, part of the cooling circuit 6 is obtained inside the engine 4 so as to directly remove the heat produced by the engine 4). The cooling circuit 6 comprises a circulation pump 7, which normally is directly operated by the engine 4 and causes the cooling liquid to flow. Finally, the cooling system 5 comprises four air radiators 8 with the shape of a parallelepiped, each of which is connected to the cooling circuit 6 so as to be flown through by the cooling liquid and is hit by an air flow when the road vehicle 1 is moving; in this way, each radiator 8 is suited to transfer heat from the cooling liquid to the external air, which means that, in each radiator 8, the cooling liquid releases heat to the outside (hence, each radiator 8 is a water-air heat exchanger designed to cause the cooling liquid coming from the engine 4 to cool down).

Generally speaking, each radiator 8 consist of a grid of small tubes (where the cooling liquid flows) alternated with fins, which, by effectively releasing the heat of the liquid to the external air current flowing through, if necessary with the help of a fan, allow for a quick reduction of the temperature of the cooling liquid flow.

The four radiators 8 are divided into two "V"-shaped structures 9, which are arranged on the right side of the road vehicle 1 (in front of a fender of the right front wheel 2) and on the left side of the road vehicle 1 (in front of a fender of the left front wheel 2), respectively. In other words, each "V"-shaped structure 9 is arranged in a front of a front wheel 2, namely in front of the fender of the front wheel 2.

In each "V"-shaped structure 9, the two corresponding radiators 8 are contiguous to one another, so that an end of a radiator 8 is close to an end of the other radiator 8; furthermore, in each "V"-shaped structure 9, the two corresponding radiators 8 face one another and are inclined so as to form, between them, an acute angle (of approximately 40° in the non-limiting embodiment shown in the accompanying figures) and so as to build, together, the "V"-shaped structure 9. In other words, in each "V"-shaped structure 9, the ends of the two radiators 8 are close to one another (basically in contact with one another) so as to define the vertex of the "V"-shaped structure 9 and the two radiators 8 are inclined relative to one another so as to diverge.

According to a preferred, though non-binding embodiment shown in FIGS. 2-5, in each "V"-shaped structure 9, two ends of the radiators 8 are mechanically constrained to one another by means of a connection element 10 interposed between the two radiators 8.

According to a preferred, though non-binding embodiment, in each "V"-shaped structure 9, the two radiators 8 are hydraulically connected to one another so that the two radiators 8 have one single common inlet 11 (shown in FIG. 1) for the cooling liquid to be cooled down and one single common outlet 12 for the cooling liquid cooled down. The hydraulic connections between the two radiators 8 of each "V"-shaped structure 9 are inserted inside the corresponding connection element 10; as a consequence, in each "V"-shaped structure 9, the two radiators 8 are hydraulically connected to one another in the area of the respective ends close to one another, which are arranged in the area of the vertex of the "V"-shaped structure 9.

According to FIG. 2, the two "V"-shaped structures 9 are oriented so as to place their vertex at the front, namely towards the front part of the road vehicle 1. As a consequence, in each "V"-shaped structure 9, each radiator 8 has an air inlet surface 13, which faces away from the other radiator 8, and an air outlet surface 14, which is opposite the inlet surface 13 and faces the other radiator 8. In other words, in each "V"-shaped structure 9, air flows into the radiators 8 from the outside and flows out of the radiators 8 from the inside.

According to a different embodiment which is not shown herein, the two "V"-shaped structures 9 are oriented so as to place their vertex at the back, namely towards the rear part of the road vehicle 1. As a consequence, in each "V"-shaped structure 9, each radiator 8 has an air outlet surface 14, which faces away from the other radiator 8, and an air inlet surface 13, which is opposite the outlet surface 14 and faces the other radiator 8. In other words, in each "V"-shaped structure 9, air flows into the radiators 8 from the inside and flows out of the radiators 8 from the outside.

According to FIGS. 2, 3 and 4, in each "V"-shaped structure 9, there are two inlet ducts 15, which are separate and isolated from one another and each convey air towards an inlet surface 13 of a corresponding radiator 8. Each inlet duct 15 is shaped so as to direct the air in such a way that it perpendicularly hits, as much as possible, the air inlet surface 13 of the corresponding radiator 8.

In the embodiment shown in FIGS. 3 and 4, in each "V"-shaped structure 9, there is one single common outlet duct 16, which receives air from an outlet surface 14 of each radiator 8 and conveys air towards the outside of the road vehicle 1. In the variant shown in FIGS. 2 and 5, in each "V"-shaped structure 9, there are two outlet ducts 16, which are separate and isolated from one another and each receive air from an outlet surface 14 of a corresponding radiator 8 and convey air towards the outside of the road vehicle 1.

In the embodiment shown in FIG. 3, in each "V"-shaped structure 9, the outlet duct 16 leads into an outlet opening 17 made through a front hood and arranged above a fender of a front wheel 2.

According to a different embodiment, in each "V"-shaped structure 9, the outlet duct 16 leads into an outlet opening 17 made through a fender of a front wheel 2 and arranged in front of the front wheel 2.

According to a further embodiment, in each "V"-shaped structure 9, the outlet duct 16 leads into an outlet opening 17 made through a side of the body and arranged in front of a fender of a front wheel 2.

According to FIGS. 4 and 5, each radiator 8 can be provided with an electrically controlled cooling fan 18, which is operated so as to force the circulation of air through the radiator 8 (typically when the road vehicle 1 is standing still or is moving at a very low speed).

It should be pointed out that, according to other embodiments which are not shown herein, there could be one single "V"-shaped structure 9 (hence, only two radiators 8 in total), which can be arranged at the centre (hence, maintaining a longitudinal symmetry) or on the side (hence, being longitudinally asymmetrical).

In the embodiment shown in the accompanying figures, the cooling system 5 is connected to the engine 4 so as to cool down the engine 4. According to other embodiments which are not shown herein, the cooling system 5 is connected to other elements of the road vehicle 1 different the engine 4 (for example, a transmission or an air conditioning system).

The embodiments described herein can be combined with one another, without for this reason going beyond the scope of protection of the invention.

The road vehicle 1 described above has numerous advantages.

First of all, the radiators 8 of the cooling system 5 described above allow the vehicle to effectively and efficiently dispose of a large quantity of heat, though having, as a whole, small dimensions thanks to the V shape of the two structures 9 and also thanks to the arrangement of the two structures 9 inside the road vehicle 1.

Furthermore, the cooling system 5 of the road vehicle 1 described above is easy and economic to be manufactured as it uses known (commercial) components, which are re-arranged in an innovative manner in order to reduce the space taken up, thus allowing for an innovative positioning inside the road vehicle 1.

LIST OF THE REFERENCE NUMBERS OF THE FIGURES 1 road vehicle
2 front wheels
3 rear wheels
4 engine
5 cooling system
6 cooling circuit
7 circulation pump
8 radiators
9 structure 10 connection element
11 inlet
12 outlet
13 inlet surface
14 outlet surface
15 inlet duct
16 outlet duct
17 outlet opening
18 cooling fan

The invention claimed is:

1. A road vehicle (1) comprising:
two front wheels (2);
two rear wheels (3);
an engine (4), which transmits a motion to either the two front wheels (2) or the two rear wheels (3); and
a cooling system (5), which is connected to the engine and comprises: a cooling circuit (6) where a cooling liquid flows; and two and only two first radiators (8) making up, together, a first "V"-shaped structure (9) arranged on a right side of the road vehicle (1); and two and only two second radiators (8) making up, together, a second "V"-shaped structure (9) arranged on a left side of the road vehicle (1) and at a given distance greater than zero from the first "V"-shaped structure (9);
wherein the first "V"-shaped structure (9) comprises the two first radiators (8) without any further radiator contacting the two first radiators (8), and the second "V"-shaped structure (9) comprises the two second radiators (8) without any further radiator contacting the two second radiators (8);
wherein the two first and the two second radiators (8) are connected to the cooling circuit (6) and designed to transfer heat from the cooling liquid to an external environment, wherein each of the two first and two second radiators (8) has a parallelepiped shape;
wherein, in the first "V"-shaped structures (9), the two first radiators (8) are contiguous to one another, so that an end of a selected one of the two first radiators (8) is close to a respective end of the other one of the two first radiators (8);
wherein, in the second "V"-shaped structure (9), the two second radiators (8) are contiguous to one another, so that an end of a selected one of the two second radiators (8) is close to a respective end of the other one of the two second radiators (8);
wherein the two first radiators (8) face one another and are inclined so as to form, between them, an acute angle and so as to create, together, the first "V"-shaped structure (9);
wherein the two second radiators (8) face one another and are inclined so as to form, between them, an acute angle and so as to create, together, the second "V"-shaped structure (9),
wherein each of the two first radiators (8) has a first air inlet surface (13) and a first air outlet surface (14), wherein the first air inlet surfaces face away from each other within the first "V"-shaped structure (9), and wherein the first air outlet surfaces face each other within the first "V"-shaped structure (9),
wherein each of the two second radiators (8) has a second air inlet surface (13) and a second air outlet surface (14), wherein the second air inlet surfaces face away from each other within the second "V"-shaped structure (9), and wherein the second air outlet surfaces (14) face each other within the second "V"-shaped structure (9)
wherein the first "V"-shaped structure (9) comprises two first inlet ducts (15), which are separate and isolated from one another and each convey air towards the air inlet surface (13) of the respective first radiator (8);
wherein the second "V"-shaped structure (9) comprises two second inlet ducts (15), which are separate and isolated from one another and each convey air towards the air inlet surface (13) of the respective second radiator (8);
wherein the first "V"-shaped structure (9) further comprises one single common outlet duct (16), which receives air from the air outlet surface (14) of each of the two first radiators (8) and conveys air towards the external environment outside of the road vehicle (1);
wherein the second "V"-shaped structure (9) further comprises one single common outlet duct (16), which receives air from the air outlet surface (14) of each of the two second radiators (8) and conveys air towards the external environment outside of the road vehicle (1);
wherein in the first "V"-shaped structure (9), the two first radiators (8) are arranged vertically relative to ground so that the first air inlet surfaces and the first air outlet surfaces extend in a vertical direction;
wherein in the second "V"-shaped structure (9), the two second radiators (8) are arranged vertically relative to ground so that the second air inlet surfaces and the second air outlet surfaces extend in the vertical direction;
wherein in the first "V"-shaped structure (9), two ends of the two first radiators (8) are mechanically constrained to one another by means of a connection element (10), which is interposed between the two first second radiators (8) and is arranged vertically relative to ground having a length extending in the vertical direction; and
wherein in the second "V"-shaped structure (9), two ends of the two second radiators (8) are mechanically constrained to one another by means of a connection element (10), which is interposed between the two second radiators (8) and is arranged vertically relative to ground having a length extending in the vertical direction.

2. The road vehicle (1) according to claim 1, wherein, in the first "V"-shaped structure (9), there is at least one common first outlet duct (16), which receives air from the first inlet surface (13) of a selected one of the first radiators (8) and conveys air towards the outside of the road vehicle (1); and
in the second "V"-shaped structure (9), there is at least one second common outlet duct (16), which receives air from the second inlet surface (13) of a selected one of the second radiators (8) and conveys air towards the outside of the road vehicle (1).

3. The road vehicle (1) according to claim 2, wherein each common outlet duct (16) leads into an outlet opening (17) arranged above a fender of a front wheel (2).

4. The road vehicle (1) according to claim 1, wherein each of the first and second "V"-shaped structures (9) is arranged in front of a front wheel (2).

5. The road vehicle (1) according to claim 1, wherein: in the first "V"-shaped structure (9), an end of one of the two first radiators (8) is mechanically constrained to another end of the other one of the two first radiators (8); and
in the second "V"-shaped structure (9), an end of one of the two second radiators (8) is mechanically constrained to another end of the other one of the two second radiators (8).

6. The road vehicle (1) according to claim 1, wherein: in the first "V"-shaped structure (9), the two first radiators (8)

are hydraulically connected to one another so that the two first radiators (8) have one single first common inlet (11) for the cooling liquid to be cooled down and one single first common outlet (12) for the cooling liquid cooled down; and in the second "V"-shaped structure (9), the two second radiators (8) are hydraulically connected to one another so that the two second radiators (8) have one single second common inlet (11) for the cooling liquid to be cooled down and one single second common outlet (12) for the cooling liquid cooled down.

7. The road vehicle (1) according to claim 1, wherein: in the first "V"-shaped structure (9), the two first radiators (8) are hydraulically connected to one another at a vertex of the respective first "V"-shaped structure (9); and in the second "V"-shaped structure (9), the two second radiators (8) are hydraulically connected to one another at a vertex of the respective second "V"-shaped structure (9).

\* \* \* \* \*